United States Patent [19]

Wang

[11] Patent Number: 5,305,594
[45] Date of Patent: Apr. 26, 1994

[54] CHAIN STRUCTURE

[75] Inventor: Wen B. Wang, Tainan Hsien, Taiwan

[73] Assignee: Yaban Chain Ind'l Co., Ltd., Tainan Hsien, Taiwan

[21] Appl. No.: 89,564

[22] Filed: Jul. 12, 1993

[51] Int. Cl.⁵ .............................. F16G 13/06
[52] U.S. Cl. .............................. 59/85; 59/4; 474/206; 474/220; 474/223
[58] Field of Search .............................. 59/4, 5, 7, 85; 474/206, 220, 222, 223

[56] References Cited

U.S. PATENT DOCUMENTS

| | | | |
|---|---|---|---|
| 586,472 | 7/1897 | Appleby | 59/85 |
| 628,386 | 7/1899 | Berry et al. | 474/20 |
| 891,189 | 6/1908 | Schmidt, Jr. | 59/85 |
| 4,043,215 | 8/1977 | Long et al. | 59/85 |
| 5,178,585 | 1/1993 | Lin et al. | 474/206 |
| 5,186,569 | 2/1993 | Wu | 59/85 |

Primary Examiner—David Jones
Attorney, Agent, or Firm—Morton J. Rosenberg; David I. Klein

[57] ABSTRACT

A chain structure is provided which includes a base plate having a pair of integral cylinders extending from one side. A connecting plate has a pair of elliptically contoured apertures at respective ends adapted to receive the corresponding cylinders. Each of the cylinders has an annular groove formed in a top portion with tapered surfaces. Each of the apertures has a pair of tapered walls at respective sides adapted to matingly engage with the tapered side walls of the connecting plate when the connecting plate is inserted into the base plate and the apertures are aligned in the annular grooves.

4 Claims, 5 Drawing Sheets

CHAIN STRUCTURE

BACKGROUND OF THE INVENTION

1. Field of the Invention

This invention relates to a chain structure which may be used in conjunction with a freewheeling mechanism of a bicycle or like vehicle. In particular, this invention pertains to a chain structure which includes a base plate having cylinder members extending therefrom for coupling to a connecting plate having elliptically contoured openings formed therethrough to provide a secure coupling between the cylinder members and the connecting plate.

2. Prior Art

Freewheeling chains of prior art devices are generally formed by a series of links coupled to each other by connecting plates which form a structure for rotating the wheels through a mechanism which allows for changing the gear ratios. Thus, the connecting plates must have sufficient structural integrity to couple the links, otherwise the chain may snap and possibly lodge itself in the gap between the freewheeling mechanism and the spokes.

A prior art structure is shown in FIGS. 7 and 8, which includes a connecting plate A having a pair of apertures A1 formed therethrough at respective ends. A base plate B is provided having a pair of integral cylinders B1 at respective ends and in alignment with respective apertures A1. Each aperture A1 includes an overlapping large circular opening A11 and a small circular opening A12 near an outer portion of the connecting plate A. Each cylinder B1 has an annularly formed groove B11 at an upper section and a knob formed at a respective extremity. The annular grooves B11 has a diameter substantially equal to the diameter of the small circular aperture or opening A12, while the diameter of the large circular aperture or opening A11 is slightly larger than the outside diameter of the knob so that the cylinder B1 may be inserted into the aperture A11 until the annular groove B11 is within the large circular aperture A11. The base plate B is pulled toward the small circular aperture A12 until they snap together and the chain structure is formed.

However, the width of the annular groove B11 is larger than the thickness of the circular apertures A11 and A12 which increases wear. The other shortcoming of the prior art is that the chain will skip or jump during pedalling or possibly jump from the chain wheel.

SUMMARY OF THE INVENTION

It is the primary object of the present invention to provide a chain structure which snaps together securely.

It is another object of the present invention to provide a chain structure which will not jump from or skip off a chain wheel when a user is pedalling.

It is a further object of the present invention to provide a chain structure which will not lodge in a gap between a freewheeling mechanism and the spoke.

DESCRIPTION OF THE PREFERRED EMBODIMENTS

Figure 1:
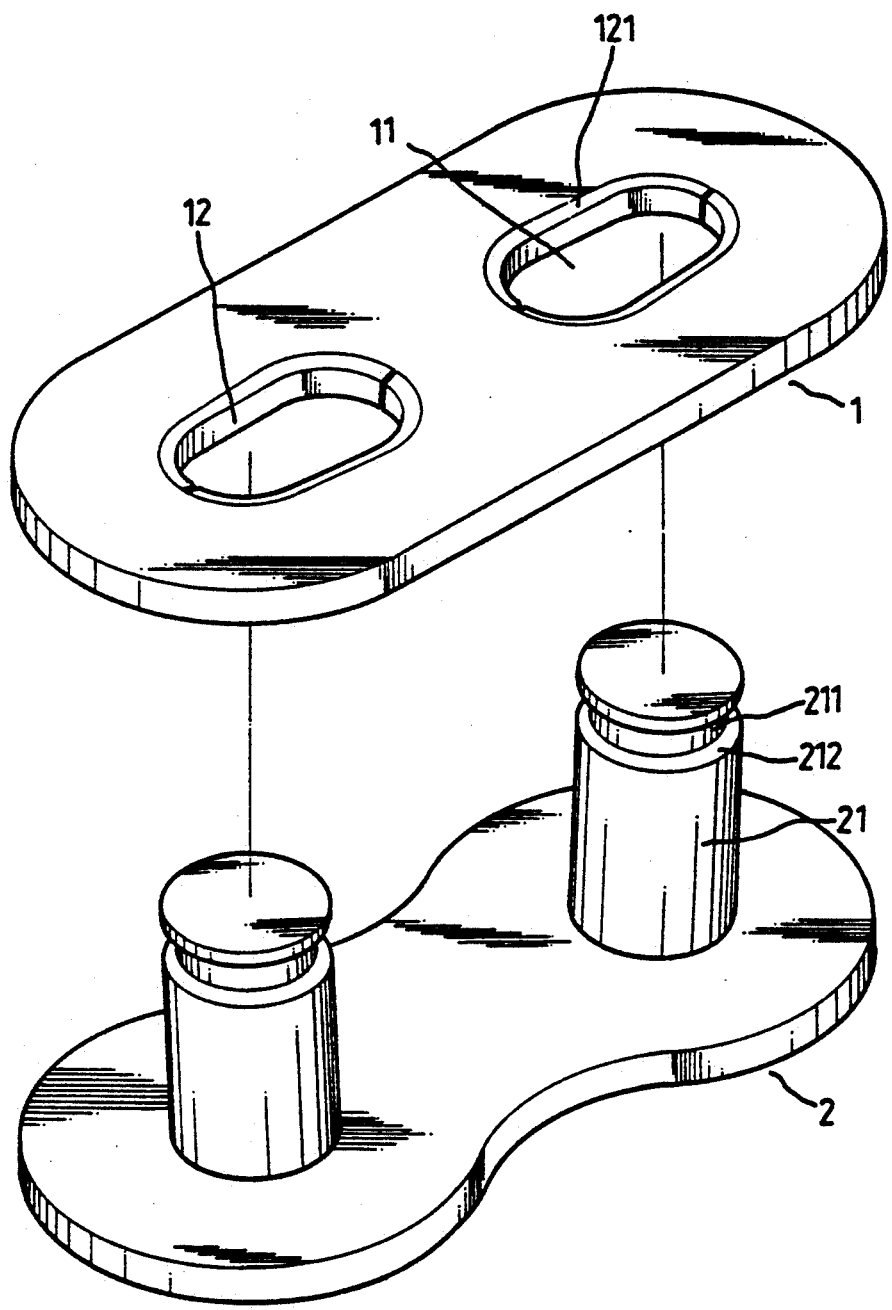
FIG. 1 is a perspective view of the subject chain structure in disconnected relation.

Referring now to FIGS. 1-6, there is shown the subject chain structure for the purpose of illustrating the preferred embodiments and not for the purpose of limiting the inventive concept illustrated therein. FIG. 1 includes a connecting plate 1 and a base plate 2 forming the present invention structure.

The connecting plate 1 has a pair of elliptically contoured apertures 11 formed therethrough and positioned at respective ends of the connecting plate 1. Each of the apertures 11 has a smaller radius at a respective outer end of the connecting plate 1 and a larger radius at a respective inner end. Each aperture 11 has an inner wall 12 which slants inwardly and has formed a tapered or inclined wall section 121.

The base plate 2 has a pair of integral cylinder members 21 extending upward from the respective ends of the base plate 2. Each cylinder 21 has an annular groove 211 formed therein at a respective top portion. Each groove 211 has a tapered or inclined surface 212 with a groove width equal to the thickness of the connecting plate 1. The outside diameter of the cylinder 21 is formed slightly smaller than the diameter of the inner end of the aperture 11, while the outside diameter of the annular groove 211 is slightly smaller than the diameter of the outer end of each aperture 11.

Figure 2:
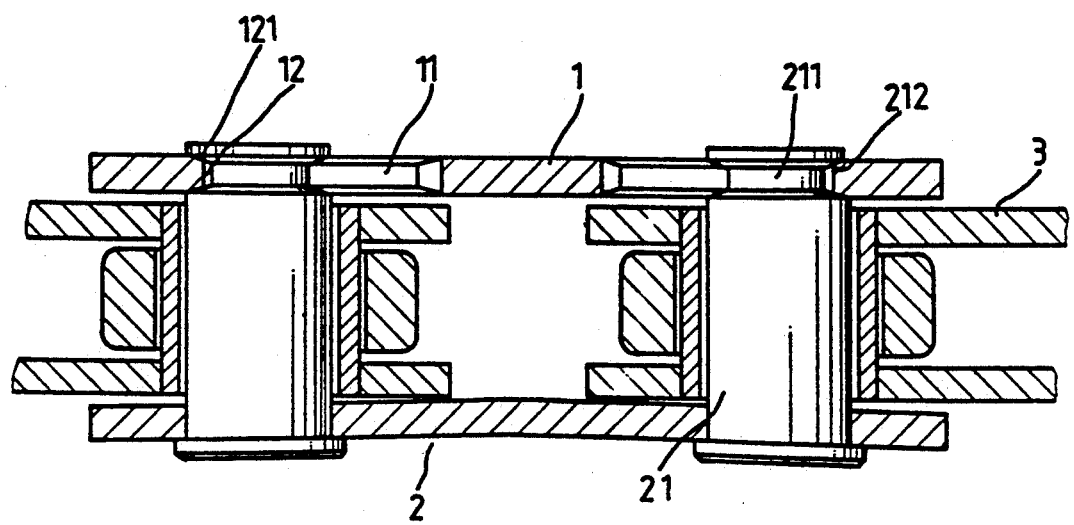
FIG. 2 is a cross-sectional elevational view showing a base plate and a connecting plate mounted in operative position on a chain.
Figure 3:
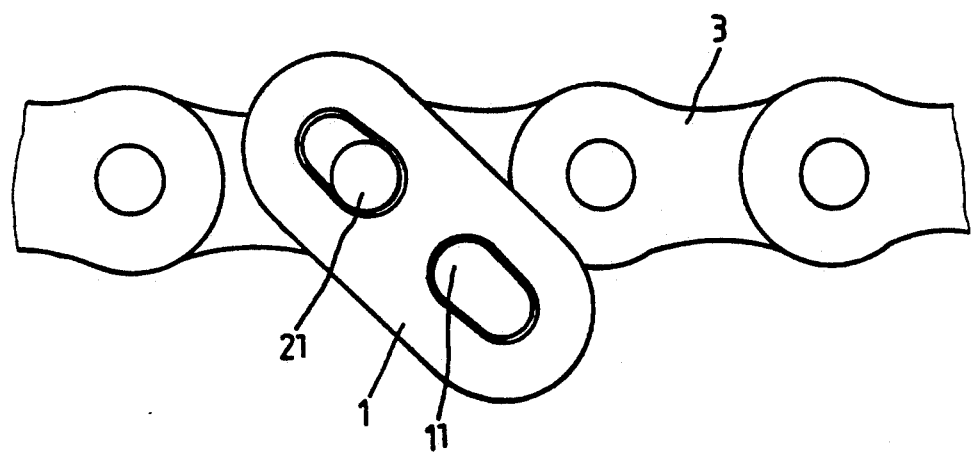
FIG. 3 is a plan view of the chain structure showing a connecting plate partially connected and partially disconnected with a cylinder member extending from a base plate.

In order to assemble the present invention, the cylinders 21 are inserted into the chain links 3 as shown in FIG. 2. A cylinder 21 is inserted into the inside portion of the aperture 11 until the groove 211 is adjacent a wall surface of a respective aperture 11. The connecting plate 1 is then pulled until the tapered surface 121 snaps into the taper 212 of the base plate 2, as shown in FIG. 3. The other aperture 11 at this time is facing the other cylinder 21 of the base plate 2. The connecting plate 1 is pressed downwardly until the aperture 11 aligns with the annular groove 211. The connecting plate 1 is pulled outwardly, allowing both surfaces 121 to engage with the surfaces 212 to complete the assembly.

Figure 4:
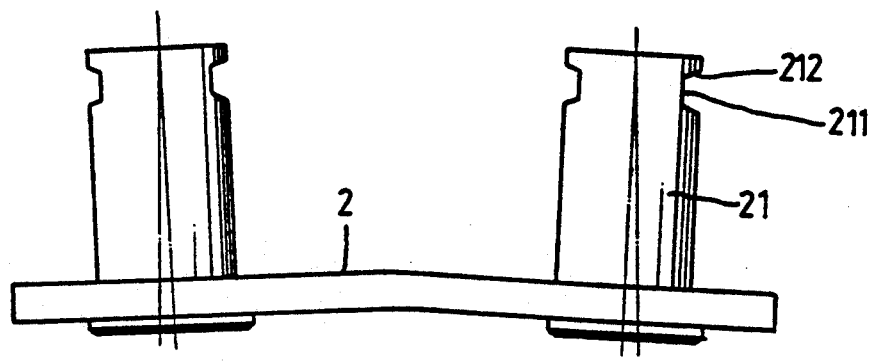
FIG. 4 is an elevational view of an embodiment of the chain structure showing the base plate of the present invention.

FIG. 4 shows an embodiment of the subject chain structure where the base plate 2 is slightly curved or inclined to cause the two cylinders 21 to incline divergently, as shown, in order to increase the distance between the two cylinders 21 and therefore produce a pulling force on the connecting plate subsequent to assembly.

Figure 5:
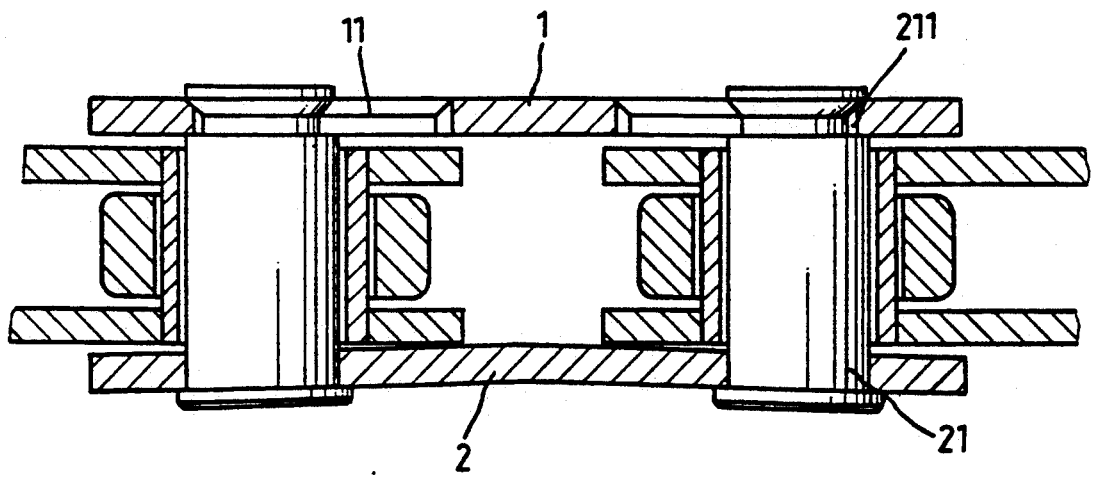
FIG. 5 is a side elevational view of FIG. 4 partly in vertical cross-section showing the base plate and the connecting plate mounted in operative position to a chain.

FIG. 5 shows another embodiment of the present invention where only one portion of the apertures 11 are inclined and the annular groove 211 has an inclined wall and an opposing horizontally directed wall for mating engagement therebetween. Thus, only one slanting or inclined surface will appear on one side, while the other side of the annular groove 211 is horizontally flat.

Figure 6:
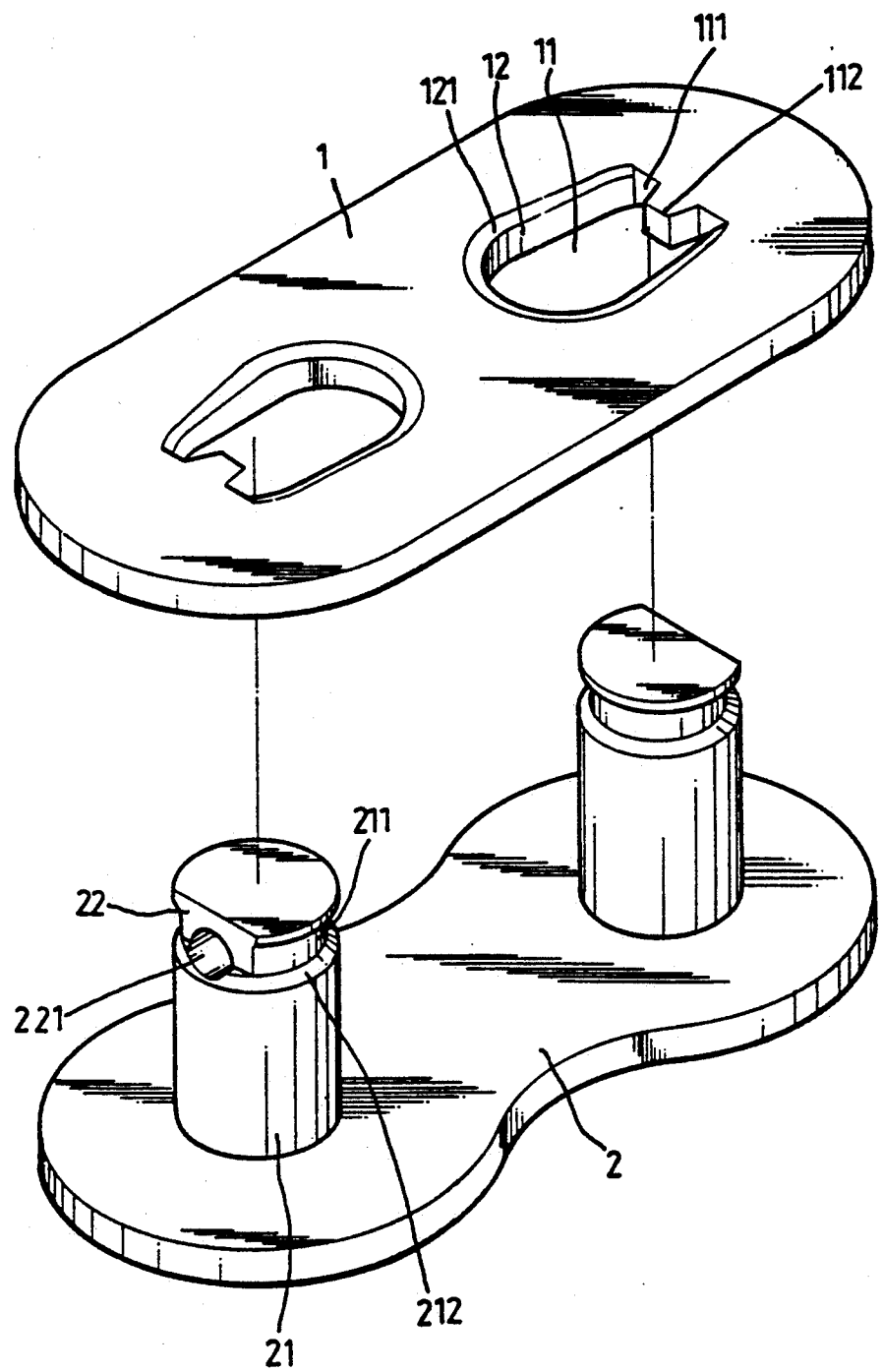
FIG. 6 is a blow-out perspective view of a second embodiment of the chain structure.
Figure 7:
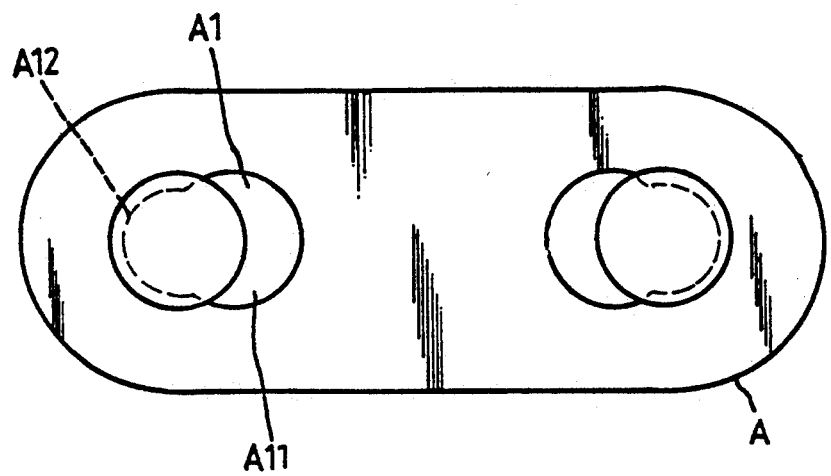
FIG. 7 is a plan view of a prior art chain structure.
Figure 8:
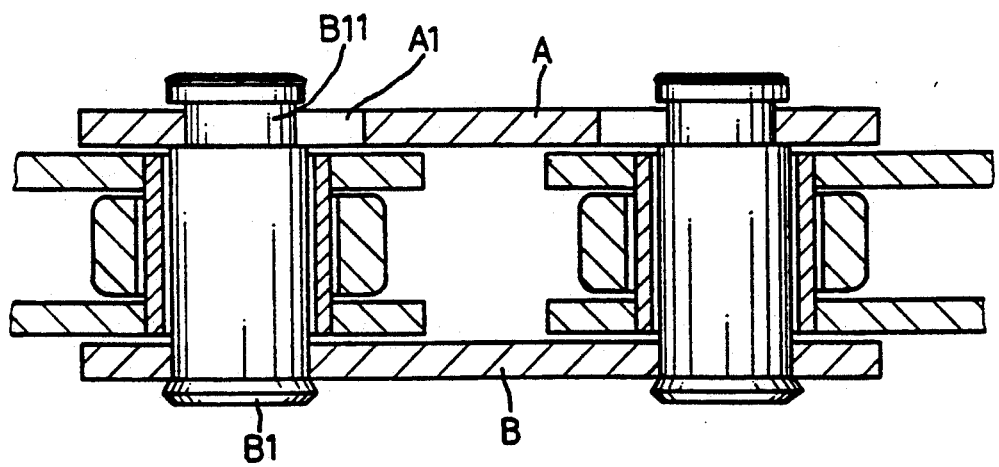
FIG. 8 is a cross-sectional view of the prior art chain structure shown in FIG. 7.

A still further embodiment of the present invention is shown in FIG. 6, where the inner ends of the two apertures 11 have extending therefrom a pair of protuberances internal to the apertures 11. The annular grooves 211 of the cylinders 21 have flat outside surfaces 22 and a pair of bores 221 are formed therein respectively adapted to receive the protuberances 112 of the apertures 11.

While there has been described and illustrated some specific embodiments of the invention, it will be clear that variations in the details of the embodiments specifically illustrated and described may be made Without departing from the true spirit and scope of the invention as defined in the appended claims.

I claim:

1. A chain having pairs of consecutively spaced apart sets of chain links comprising:
    (a) a base plate member having a pair of cylinder members extending through and rotatably coupled to a pair of said consecutively spaced apart chain links, each of said pair of cylinder members being coupled to said base plate member at a lower section thereof and having an annular groove formed in an upper section thereof forming a pair of opposing cylinder groove walls, at least one of said cylinder groove walls being inclined; and,
    (b) a connecting plate member rotatably coupled to said cylinder members having a pair of elliptically contoured through openings formed therethrough, each of said elliptically contoured through openings having an inner end section and an opposing outer end section, said inner end section having an inner radius greater than an outer end section radius, each of said elliptically contoured openings defining an elliptical wall member having opposing upper and lower wall surfaces for mating engagement with said opposing groove walls of a respective cylinder member, at least one of said upper and lower wall surfaces being inclined for mating engagement with a respective inclined cylinder groove wall.

2. The chain as recited in claim 1 where each of said base plate member includes opposing inclined end sections, said respective pair of cylinder members extending from said base plate member in a diverging inclined direction each with respect to the other.

3. The chain as recited in claim 1 wherein each of said opposing cylinder groove walls and each of said elliptical upper and lower wall surfaces is inclinedly directed for mating engagement therewith.

4. The chain as recited in claim 1 including a protuberance formed at said outer end section of each of said elliptically contoured openings and respectively extending internal thereto, each of said cylinder annular grooves having a planar surface and a groove opening formed therethrough for insert therein of said protuberance.

* * * * *